Oct. 30, 1956 — C. A. SHERMAN ET AL — 2,768,502
POWER BOOSTER FOR BRAKES
Filed May 14, 1953 — 3 Sheets-Sheet 1

INVENTORS.
Clarence A. Sherman.
Carl Kalitta.
BY Maxwell K. Murphy
ATTORNEY.

Oct. 30, 1956  C. A. SHERMAN ET AL  2,768,502
POWER BOOSTER FOR BRAKES
Filed May 14, 1953  3 Sheets-Sheet 2
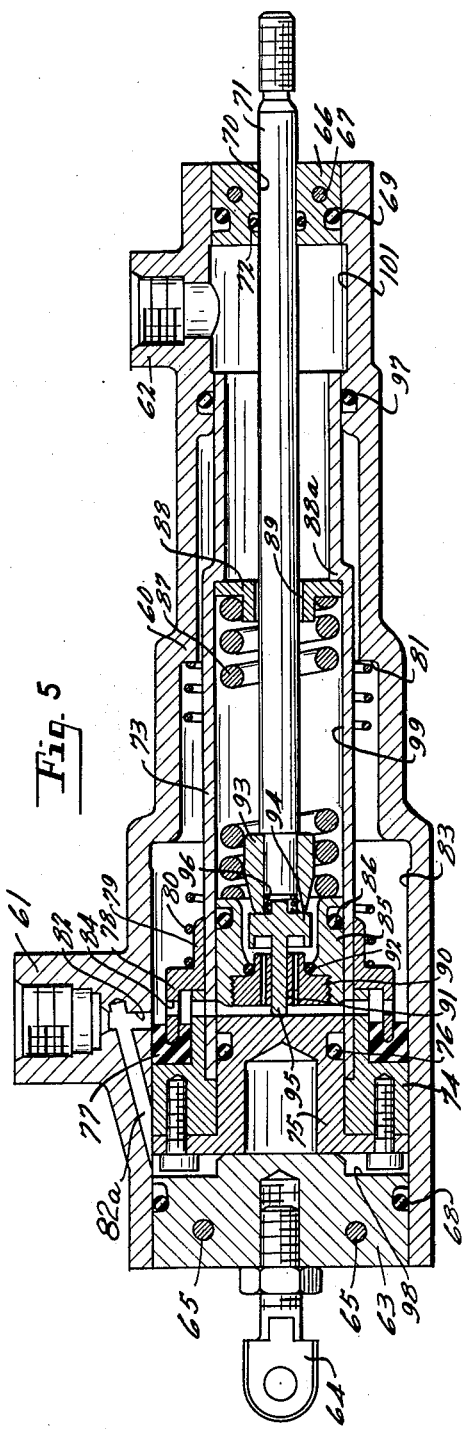
INVENTORS.
Clarence A. Sherman
Carl Kalitta.
BY
Maxwell K. Murphy
ATTORNEY INVENTORS.
Clarence A. Sherman
Carl Kalitta
BY
Maxwell K. Murphy
ATTORNEY

United States Patent Office 2,768,502
Patented Oct. 30, 1956

2,768,502

POWER BOOSTER FOR BRAKES

Clarence A. Sherman and Carl Kalitta, Detroit, Mich., assignors to Detroit Harvester Co. of N. Y., Inc., Detroit, Mich., a corporation of New York Application May 14, 1953, Serial No. 355,096

1 Claim. (Cl. 60—54.6)

Our invention relates to a new and useful improvement in a power booster for brakes and is particularly adaptable for use in connection with the braking system used on aeroplanes.

It is an object of the present invention to provide a booster of this class embodying a cylinder in which may be obtained an initial displacement of large volume with low pressure succeeded by displacement of low volume with high pressure.

Another object of the invention is the provision in a device of this class of a pair of plungers operated independently of each other and capable of operating in unison with each other, so arranged and constructed that upon developing a predetermined pressure through the operation of the plunger producing a high volume of flow at low pressure the plunger will automatically become hydraulically locked, and the second plunger producing a low volume of flow to develop high pressure will operate.

Another object of the invention is the provision of a mechanism so arranged and constructed that the position of the individual operation of these two plungers may be determined and adjusted.

Another object of the invention is the provision of a mechanism of this class in which quick action and high pressure may be obtained without the necessity of a vacuum booster or the use of any exterior boosters.

Other objects would appear hereinafter.

It is recognized that various modifications and changes may be made in the detail of structure illustrated without departing from the invention, and it is intended that the present disclosure shall be considered but the preferred embodiment.

Forming a part of this application are drawings in which,

Fig. 5, is a longitudinal central sectional view of a modification,

Fig. 6, is a view similar to Fig. 5 showing the parts moved to another position.

Figure 1:
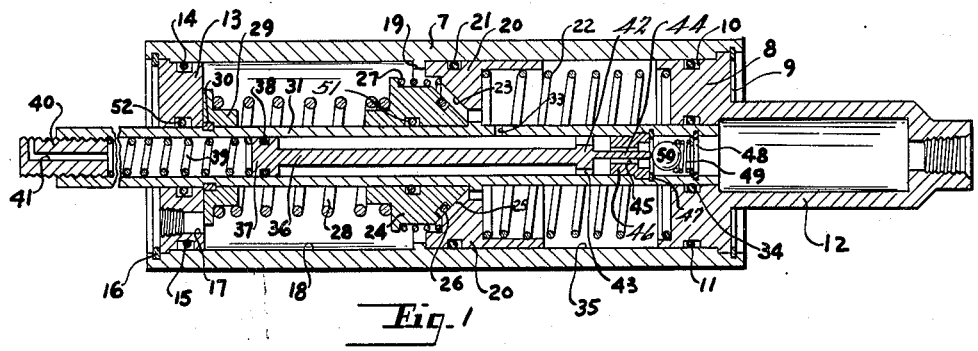
Fig. 1, is a longitudinal, central sectional view of the invention.

In the drawings I have illustrated the invention as embodying a housing or cylinder 7 having an end wall 8 secured in one of the ends by the ring 9 and provided on its periphery with a groove 10 in which is positioned a sealing ring 11. Serving as a closure for the opposite end of the housing 7 is an end wall 13 in which is formed a groove 14 in which is positioned a sealing ring 15, the retaining ring 16 serving to retain the member 13 in position. Formed in this end wall 13 is an inlet port 17 through which liquid may be delivered under pressure from a suitable source.

An inwardly projecting annular rib 19 is formed on the inner surface of the cylinder or housing 7 between the ends thereof.

Slideable in the cylinder or housing 7 is a piston 20 carrying the sealing ring 21 and formed annular with an opening in the center thereof. This piston 20 is normally maintained at one of its end faces in engagement with a face of the rib 19 by the spring 22, one end of which engages the piston 20 and other end of which engages the end wall 8 as shown on Fig. 1.

A plunger or piston 24 is mounted in the casing 7 and provided with a face 25 adapted to engage the face 23 of the piston 20. Positioned in the face 25 is a sealing ring 26 so that the piston 20 and the plunger 24 cooperate together to form a valve. Embracing this plunger 24 and bearing at one end with this plunger 24 and at the other end against the piston 20 is a spring 27 tending to normally maintain the faces 23 and 25 in separated relation. Embracing the tube 31 which is slideably projected through the end wall 13 is a spring 28 one end of which bears against the plunger 24 and the other end of which bears against a collar 29 fixedly mounted by the key 30 on the tube 31. The springs 27 and 28 bear such a relation to each other that until pressure is exerted upon the tube 31 sufficiently to move it longitudinally to the right of cylinder 7, the spring 27 will maintain clearance between faces 23 and 25. When in neutral position, as shown in Fig. 1, liquid entering through the inlet port 17 will flow into chamber 18 and through the space between the faces 23 and 25 into the chamber 35, whence it may pass through the passage 33 into the interior of the tube 31. This tube 31 slideably projects through the end wall 8, a suitable sealing ring 34 being positioned in this end wall 8. The tube 31 projects centrally through these end walls and therefore is in alignment with a tubular body 12 which projects centrally outwardly from the end of wall 8. This tubular body 12 is intended to be connected by a conduit to the brake system of the vehicle with which used. While, as stated, the invention is well adapted for use on the braking system of aeroplanes it will appear from the description that the mechanism may be used generally on any hydraulic brake system or in hydraulic systems in which high volume and low pressure succeeded by high pressure and low volume flow is desired.

Slideably mounted in the tube 31 is a plunger embodying the stem 36 and the head or piston 37 which carries a suitable seal ring 38. Bearing at one end against one face of the head or piston 37 is a spring 39 the other end of which bears against a fitting 40 threaded into the end of the tube 31 and which serves as a means for adjusting the tension of the spring 39. Passage 41 is formed in the member 40 so as to communicate with the interior of the tube 31 at one side of the piston or head 37.

Formed adjacent the opposite end of the stem 36 is a guiding head 42 through which are formed passages 43. Projecting outwardly from the guiding head 42 is a finger 44 which projects through a passage 45 formed in valve seat 46 fixedly mounted by means of the ring 47 in the tube 31. A retaining ring 48 engages one end of a spring 49, the other end of which engages a ball 50. The spring 49 normally urges the ball 50 onto the valve seat so as to close communication between the member 12 and the interior of the tube 31 beyond the valve.

Figure 2:
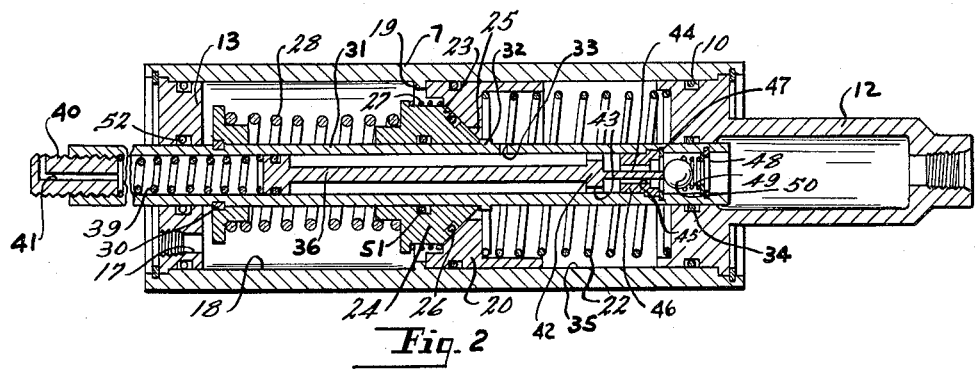
Fig. 2, is a view similar to Fig. 1, showing the mechanism moved to one position.

In use, the housing or cylinder 7 would be connected so that fluid under pressure would be delivered thereinto through the high pressure inlet port 17 and this fluid would pass therefrom through the member 12 to the brakes of the vehicle. The tube 31 would be suitably connected to the brake pedal so that the operator of the vehicle, upon operating the brake pedal, would move the tube 31 longitudinally of the housing or cylinder 7 to the right of the drawings. In Fig. 2 this movement has been effected until the plunger 24 has come into contact with the piston 20 so that communication between the chambers 18 and 35 is closed. The thrust to the member 24 is delivered through the spring 28 and leakage of oil or liquid through the member 24 around the tube 31 is prevented by the seal 51. Leakage around the tube 31 at the end wall 13 is prevented by the seal 52.

Figure 3:
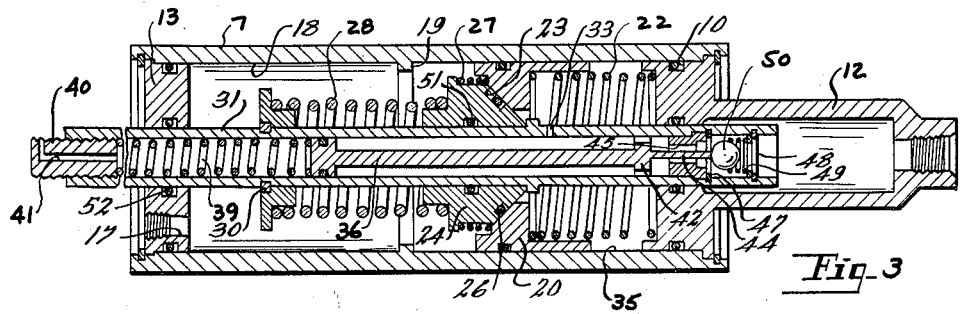
Fig. 3, is a view similar to Fig. 2, showing further position of movement.
Figure 4:
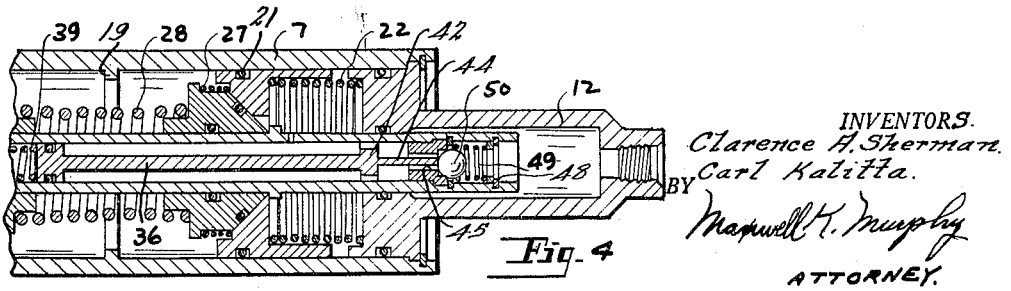
Fig. 4, is a fragmentary sectional view showing a further position of movement.

When the parts have moved to the position shown in Fig. 2, the chamber 35 is filled with liquid as is likewise the member 12 and its connections to the brake. Further movement of the tube 31 will move the parts to the position shown in Fig. 3, so that the liquid in the chamber 35 is thus forced by the piston 20 in a high volume of flow through the member 12, the liquid passing through the passage 33 and through the passage 45 in the valve seat, this passage 45 being larger than the finger 44. It will be noted that the ball 50 is maintained apart from its seat and the relationship between the springs 39 and 49 is such that the valve is thus maintained open. As this movement continues with the high volume of flow of liquid through the member 12, the pressure will be gradually built up in the line until sufficient pressure is reached to cause the valve 50 to move on to its seat against the compression of the spring 39, as shown in Fig. 4. When this situation has been reached a hydraulic lock in the chamber 35 is established so that the parts 20 and 24 will now remain stationary. As further movement of the tube 31 is effected the closed end of the tube or the valve itself in the closed end will serve as a piston to force the liquid out of the member 12 in a low volume but to develop a high pressure in the line. By adjusting the tension of the spring 39 the position at which the valve will be closed may be determined. Upon release of the pressure on the rod 31 the parts will return to their normal position, shown in Fig. 1, the ball 50 being moved off its seat as soon as the pressure in the member 12 and the tension of spring 49 are over-balanced by the tension of the spring 39. The movement of the tube 31 to the left of the drawings is effected primarily through the pressure of the spring 28 and it is obvious that the spring 22 will also function in moving the piston 20 to the position shown in Fig. 1.

In this way there is provided a structure which is compact and highly efficient in use as well as possessing the advantages referred to.

Figure 7:
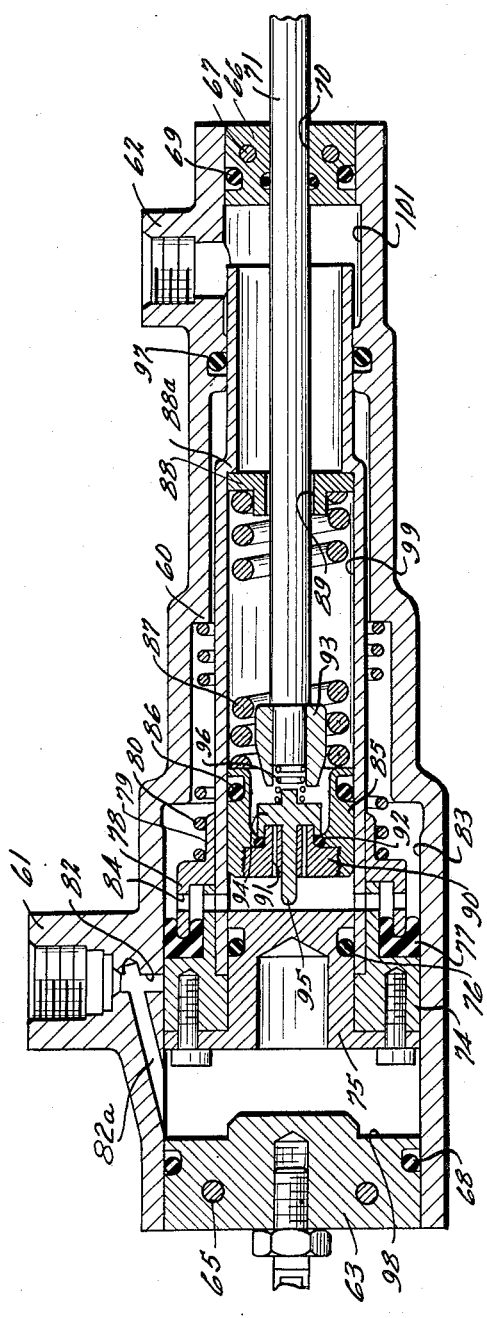
Fig. 7, is a view similar to Fig. 6 showing another position of movement.

In the forms shown in Fig. 1 to Fig. 4 inclusive the operation is a pushing operation upon the movement of the pedal. In Fig. 5 to Fig. 7 inclusive we have shown a slight modification in which the actuation is obtained by a pulling operation rather than a pushing operation.

As shown in Fig. 5, Fig. 6 and Fig. 7 we provide a housing 60 having an inlet 61 which leads from a source of liquid under pressure or from an elevated reservoir. This housing is also provided with outlet conduit or port 62 which leads to the brake to be operated. One end of the housing 60 is closed by an end wall 63 held in the end of the housing 60 by the bolts 65. Projecting outwardly from this end wall 63 is a lug 64 which may be fastened to any suitable fastening means on an aeroplane.

The opposite end of the housing 60 is closed by the end wall 66 maintained in position by the bolts 67. A sealing ring 68 seals the end wall 63 against leakage, and a similar sealing ring 69 seals the end wall 66 against leakage. Formed through this end wall 66 is a passage 70 through which extends the rod 71 sealed at its periphery by the sealing ring 72.

Slideable in the housing 60 is a tube 73 embracing which is an annulus 74 secured to which is a plug 75, the annulus embracing the tube 73 and the plug 75 being projected into the tube 73. This plug 75 is sealed at the tube 73 by means of the sealing ring 76. Carried by and embracing the annulus 74 is a ring 77 formed from rubber or other suitable material so that the annulus 74 thus forms a piston which slides in unison with the tube 73.

A collar 78 is provided with a neck 79 which embraces the tube 73 and moves in unison therewith. One end of a coil spring 80 bears against the collar 78 and the other end bears against the shoulder 81 formed in the housing 60, this spring normally tending to move the collar 78 and annulus 74 to the left of the drawing into position shown in Fig. 5.

A passage 82 serves to communicate the inlet port 61 with the chamber 83. When in the position shown in Fig. 5 this passage 82 is also in communication with the passage 84 so as to deliver liquid between the face of the plug 75 and the piston 85 which is slideably mounted in the tube 73. This piston 85 is sealed at the inner surface of the tube 73 with the sealing ring 86. One end of a coiled spring 87 bears against the piston 85 and the other end bears against the disk 88 which engages the shoulder 88a formed on the tube 73. The rod 71 projects through an opening 89 formed through the disk 88, and, as clearly shown in the drawings, this opening is larger than the diameter of the rod 71.

Secured to the piston 85 is a valve seat 90 having openings 91 formed therethrough. This valve seat is sealed with the piston 85 by means of the sealing ring 92. The piston 85 has an extension 93 which is secured to the rod 71. A valve head 94 is provided which has a finger 95 slideably projecting through the valve seat 90. A spring 96 engages at one end the rod 71 and at the other end the valve 94, tending normally to move the valve on to its seat. This tube 73 is also sealed in the housing 60 by means of the sealing ring 97.

The passage 82a communicates with the interior of the housing 60 behind the piston formed of the annulus 74 so as to serve as a means for delivering liquid into chamber 98. Through the openings or passages 91 which are formed through the valve seat 90 liquid may pass into the chamber 99 between the piston 85 and the disk 88.

When the brakes are not applied the structure would be in the position shown in Fig. 5, and upon a rocking of the brake pedal by the pilot the rod 71 would be pulled to the right of Fig. 5. When the structure is in the position shown in Fig. 5 it is obvious that the chambers 83, 99 and 101 will be filled with liquid as would likewise the conduit leading from the outlet port 62 to the brake. The valve 94 is held off its seat through engagement of the finger 95 with the face of the plug 75. When it is desired to apply the brake the rod 71 is pulled to the right, moving the parts to the position shown in Fig. 6. In this movement the larger piston formed from the annulus 74 also moves to the right, forcing the liquid in its path to pass through the passage 84 and through the passage 91 in the valve seat into the chambers 99 and 101 thus forcing the liquid in large volume but with a low pressure through the outlet 62. This movement, of course, is against the compression of the springs 80 and 87. When the pressure is built up sufficiently to overcome the thrust delivered to the tube 73 by the spring 87, parts will move into the position shown in Fig. 7 so that the finger disengages the face of the plug 75 and the valve head 94 will move onto its seat. In the further movement of the rod to the right, the piston 85 begins to function by itself in forcing the liquid through the clearance 89 in the disk 88 and outwardly through the outlet port. The travel of the liquid would thus be at a low volume but under a high pressure so that the advantages referred to as being present in the form shown in Fig. 1 to Fig. 4 are also present in this structure.

What we claim is:

In a compound hydraulic master cylinder having inlet and outlet chambers, a piston slidable in the inlet chamber, a tube carried by said piston and connecting said chambers, a second piston slidably disposed within said tube and having a piston rod connected thereto, a spring operably disposed between said second piston and said tube whereby said second piston and tube move in unison in response to movement of said rod until the load of said spring is overcome, a normally open valve carried by said second piston for providing open communication between said chambers, and means operable to close said valve in response to relative movement between said tube and second piston.

References Cited in the file of this patent

UNITED STATES PATENTS

| | | |
|---|---|---|
| 2,004,078 | McDougall | June 4, 1935 |
| 2,190,238 | Lepersonne | Feb. 13, 1940 |
| 2,348,367 | Schnell | May 9, 1944 |
| 2,393,524 | Fant | Jan. 22, 1946 |
| 2,463,173 | Gunderson | Mar. 1, 1949 |
| 2,499,775 | Piganeau | Mar. 7, 1950 |
| 2,518,821 | Roy | Aug. 15, 1950 |
| 2,597,404 | Teske | May 20, 1952 |
| 2,661,597 | Edge | Dec. 8, 1953 |